US009033563B1

(12) United States Patent
Hsu

(10) Patent No.: US 9,033,563 B1
(45) Date of Patent: May 19, 2015

(54) VEHICLE HEADLIGHT ASSEMBLY

(71) Applicant: Chen-Wei Hsu, Tainan (TW)

(72) Inventor: Chen-Wei Hsu, Tainan (TW)

( * ) Notice: Subject to any disclaimer, the term of this patent is extended or adjusted under 35 U.S.C. 154(b) by 0 days.

(21) Appl. No.: 14/162,759

(22) Filed: Jan. 24, 2014

(51) Int. Cl.
*B60Q 1/00* (2006.01)
*F21S 8/10* (2006.01)

(52) U.S. Cl.
CPC ........... *F21S 48/115* (2013.01); *F21S 48/1208* (2013.01); *F21S 48/1104* (2013.01); *F21S 48/321* (2013.01)

(58) Field of Classification Search
CPC F21Y 2101/02; F21S 48/115; F21S 48/1154; F21S 48/1159; F21S 48/1168; F21S 48/32; F21S 48/1208; F21S 48/1104; F21S 48/321; F21V 29/004
USPC .................. 362/547, 507, 543, 545, 548, 549
See application file for complete search history.

(56) References Cited

U.S. PATENT DOCUMENTS

| | | | | |
|---|---|---|---|---|
| 7,988,336 | B1 * | 8/2011 | Harbers et al. ................ | 362/294 |
| 8,657,462 | B2 * | 2/2014 | Schwalenberg et al. ...... | 362/219 |
| 8,840,291 | B2 * | 9/2014 | Meyer-Wendt et al. ...... | 362/547 |
| 2008/0043478 | A1 * | 2/2008 | Wang ............................ | 362/373 |
| 2009/0296416 | A1 * | 12/2009 | Luo et al. ...................... | 362/487 |
| 2011/0058387 | A1 * | 3/2011 | Matsunaga et al. ........... | 362/547 |

* cited by examiner

*Primary Examiner* — Anh Mai
*Assistant Examiner* — Glenn Zimmerman

(57) ABSTRACT

A vehicle headlight assembly includes a housing, a lens, a radiation member and a circuit board. The housing has a first hole, and multiple first and second fixing tubes extend from the inside of the housing. The lens is located in the first hole of the housing and has at least two legs which are fixed to the first fixing tubes by multiple first fixing members. The lens has a multiple-focus curved surface on the front side thereof. The radiation member is located in the housing and behind the lens. The radiation member is connected to the second fixing tubes by multiple second fixing members. The radiation member has multiple fins and a fixing board to which the circuit board is connected. The circuit board has multiple Light Emitting Diodes whose beams pass through the multiple-focus curved surface of the leans and are spread to desired angles and areas.

3 Claims, 8 Drawing Sheets

VEHICLE HEADLIGHT ASSEMBLY

BACKGROUND OF THE INVENTION

1. Fields of the invention

The present invention relates to a vehicle headlight assembly, and more particularly, to a vehicle headlight assembly having Light Emitting Diodes on the circuit board and the light beams pass through the lens with a multiple-focus curved surface to reach the light beams to desired angles and areas.

2. Descriptions of Related Art

As shown in FIG. 2, the conventional vehicle headlight assembly 1 comprises a housing 10 with a space 100 defined therein. The space 100 has a curved reflection surface 101. A light source 11 is located in the space 100. A connection frame 12 is connected to the front of the housing 10 and has a shade unit 13 connected thereto. The shade unit 13 has an electromagnetic valve 130 and a shade 131. A lens 14 is connected to the connection frame 12 by a fixing frame 15. The light beams from the light source 11 are reflected by the reflection surface 101 and pass through the lens 14. The angle and area that the light beams reach are controlled by the shade unit 13. However, the light beams after being reflected by the reflection surface 101 would be so scattered to be less brightness. Besides, the space 100 is small and narrow, the light source 11 generates significant heat which cannot be quickly removed due to lack of radiation device. The high temperature reduces the life term of the headlight assembly 1. The shade 13 in the headlight assembly 1 also increases the manufacturing cost of the headlight assembly 1.

The present invention intends to provide a vehicle headlight assembly that effectively improves the shortcomings mentioned above.

SUMMARY OF THE INVENTION

The present invention relates to a vehicle headlight assembly and comprises a housing having a first hole. Multiple first fixing tubes and second fixing tubes extend from the inside of the housing. A lens is located in the first hole of the housing and has at least two legs extending backward therefrom. Each of the at least two legs has a second hole defined through the distal end thereof. Multiple first fixing members respectively extend through the second holes and are threadedly connected to the first fixing tubes of the housing. The lens has a multiple-focus curved surface on the front side thereof. A radiation member is located in the housing and behind the lens. The radiation member has multiple third holes. Multiple second fixing members extend through the third holes and are threadedly connected to the second fixing tubes of the housing. The radiation member has multiple fins extending therefrom. A fixing board is connected to the front side of the radiation member and has multiple fourth holes and threaded holes. At least one circuit board is connected to the fixing board and has multiple Light Emitting Diodes connected to the front side thereof. Wires are connected to the rear side of the at least one circuit board and extend through the fourth holes of the fixing board. The at least one circuit board has multiple first notches defined in the periphery thereof. Multiple third fixing members extend through the first notches and are threadedly connected to the threaded holes of the fixing board on the radiation member.

Preferably, the at least two legs of the lens each are stepped shaped. A protrusion extends from outside of each of the at least two legs of the lens.

Preferably, the at least one circuit board has an isolation plate connected thereto which has a first opening defined centrally therethrough. The Light Emitting Diodes on the at least one circuit board extend through the first opening. The isolation plate has multiple second notches defined in the periphery thereof. The second notches are located corresponding to the first notches of the at least one circuit board. The isolation plate has a fixing plate connected thereto which has a second opening located corresponding to the first opening of the isolation plate. The fixing plate has multiple third notches defined in the periphery thereof. The third notches are located corresponding to the second notches of the isolation plate and the first notches of the at least one circuit board. The third fixing members extend through the third notches of the fixing plate, the second notches of the isolation plate and the first notches of the at least one circuit board, and are threadedly connected to the threaded holes of the fixing board of the radiation member.

Preferably, the multiple-focus curved surface of the lens is designed to let the light beams be delivered to desired angles and areas.

The primary object of the present invention is to provide a vehicle headlight assembly which does not need the shade and the light beams can be controlled to be delivered to desired angles and areas. The light beams are even and have better illumination. The radiation member removes the heat generated from the Light Emitting Diodes to prolong the life term of the vehicle headlight assembly.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
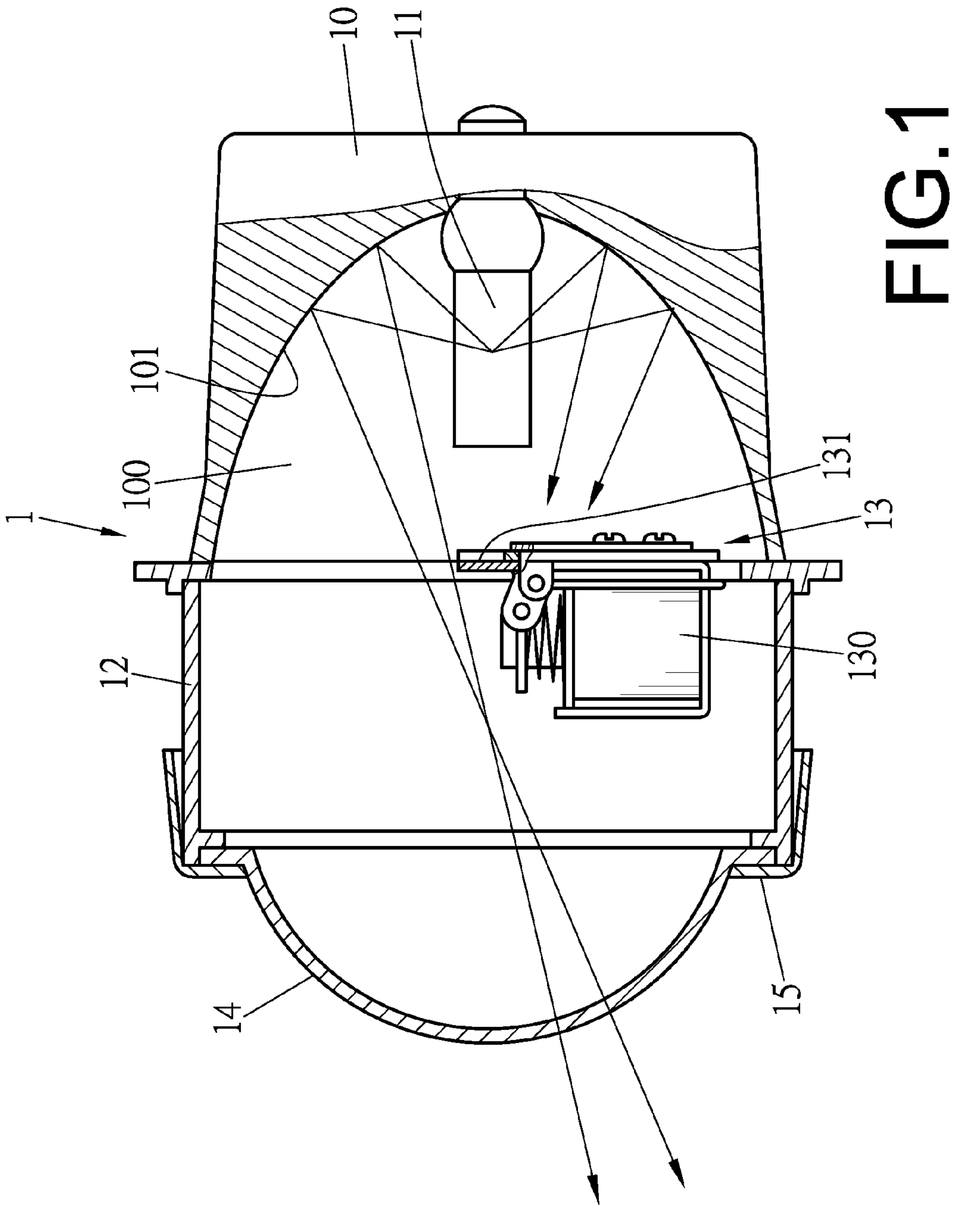
FIG.1 (PRIOR ART)
FIG. 1 is a cross sectional view of a conventional vehicle headlight assembly.
Figure 2:
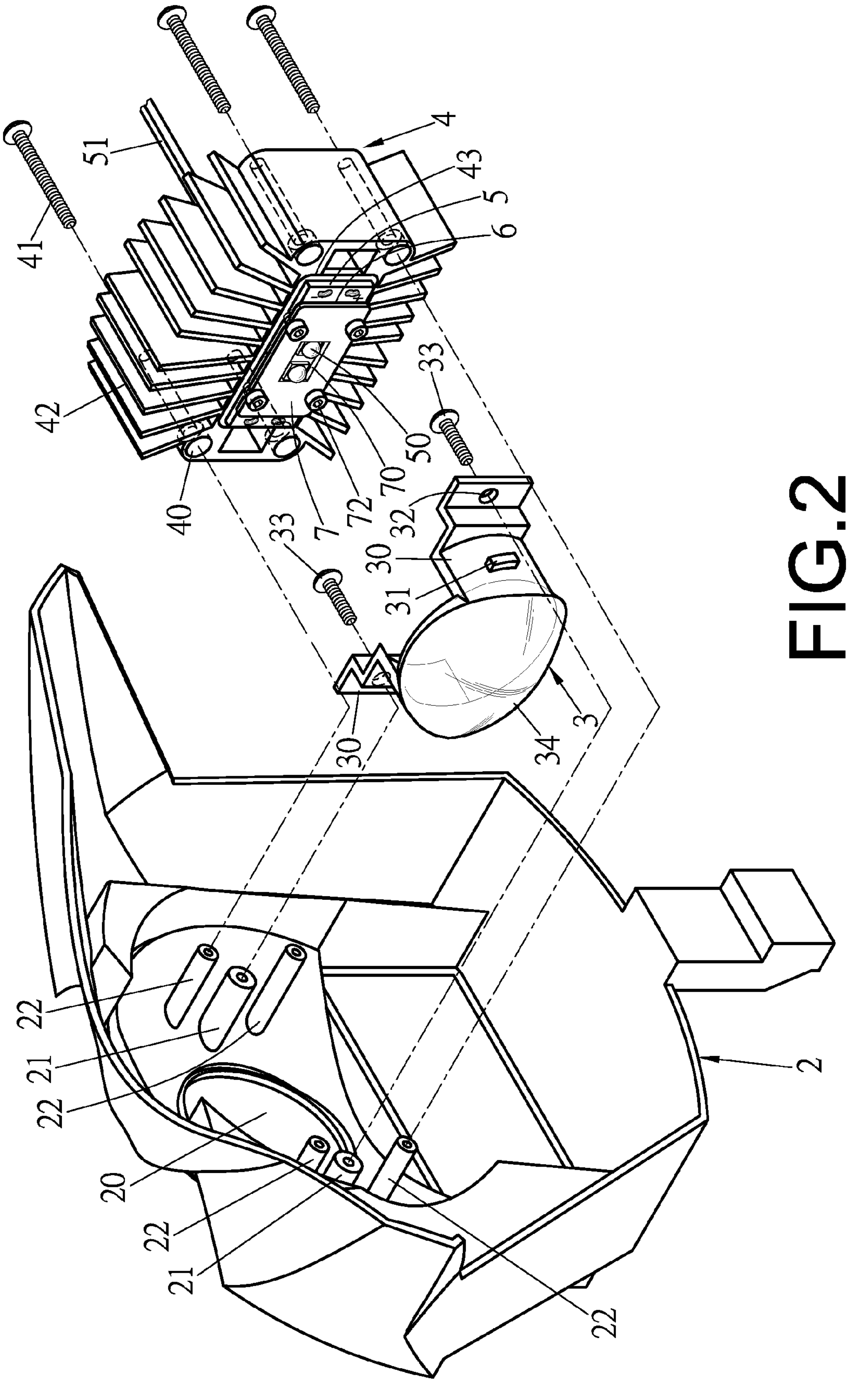
FIG. 2 is an exploded view of the vehicle headlight assembly of the present invention.
Figure 3:
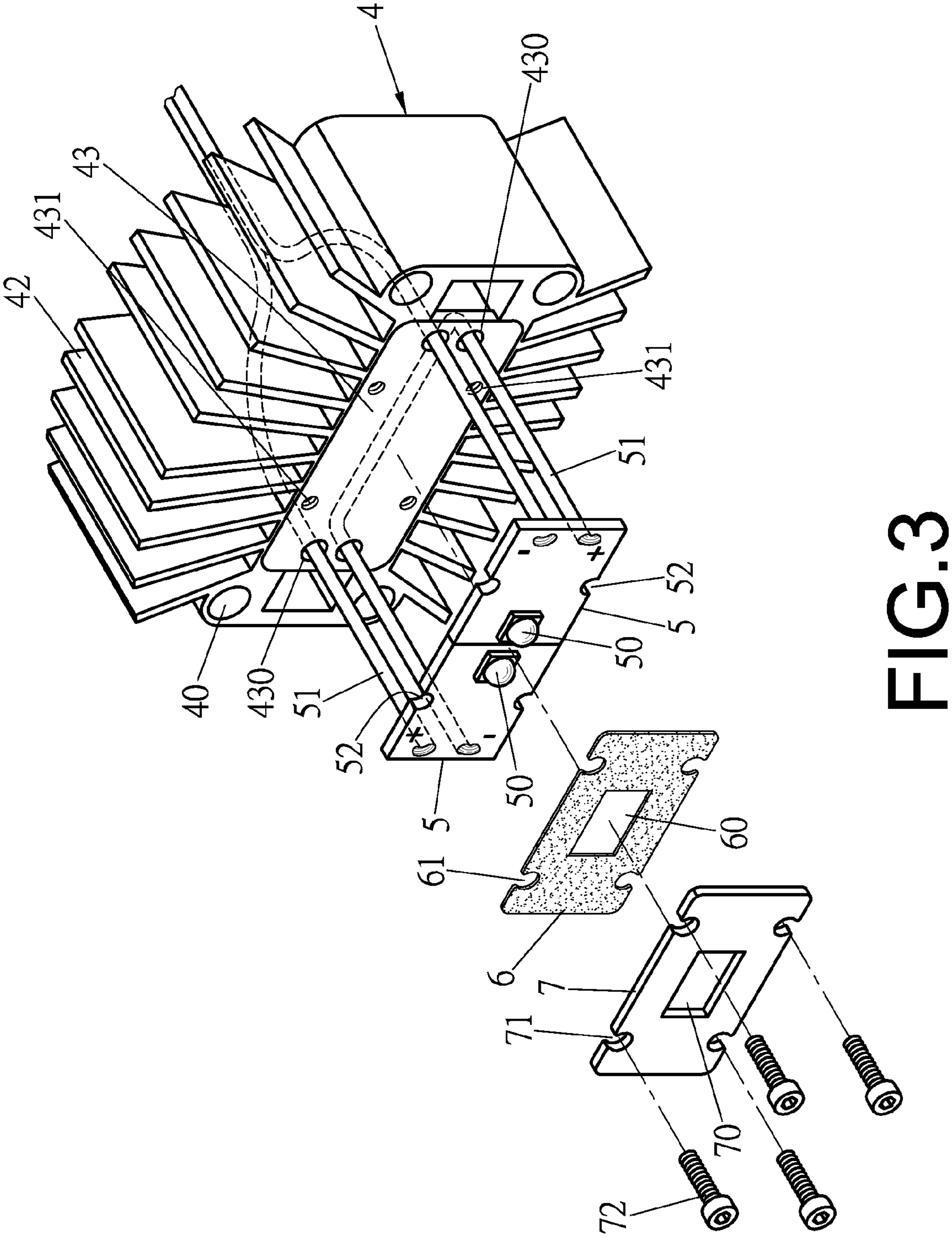
FIG. 3 is an exploded view of the circuit board and the radiation member of the vehicle headlight assembly of the present invention.
Figure 4:
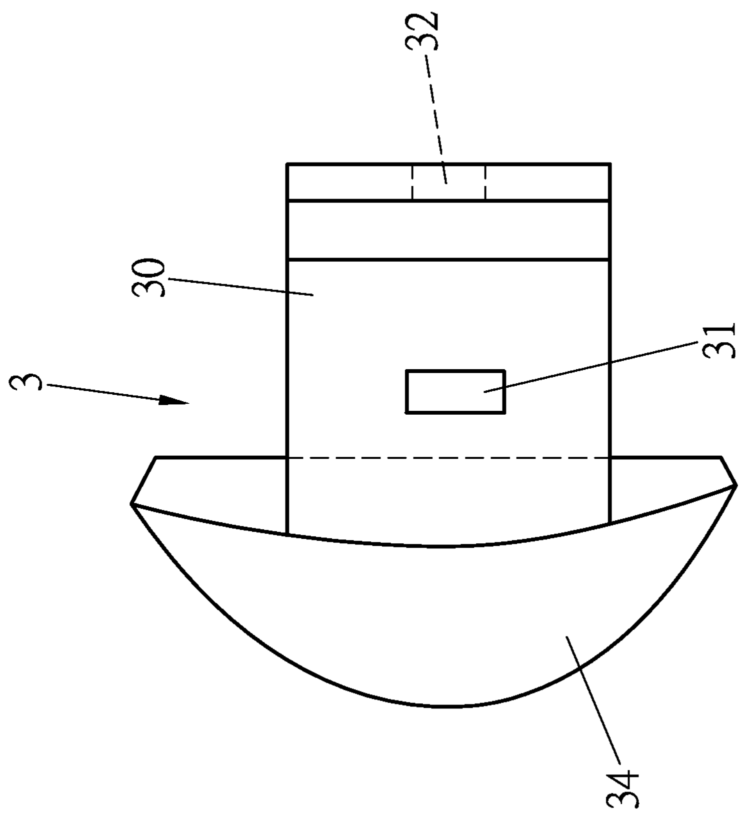
FIG. 4 is a side view of the lens of the vehicle headlight assembly of the present invention.
Figure 5:
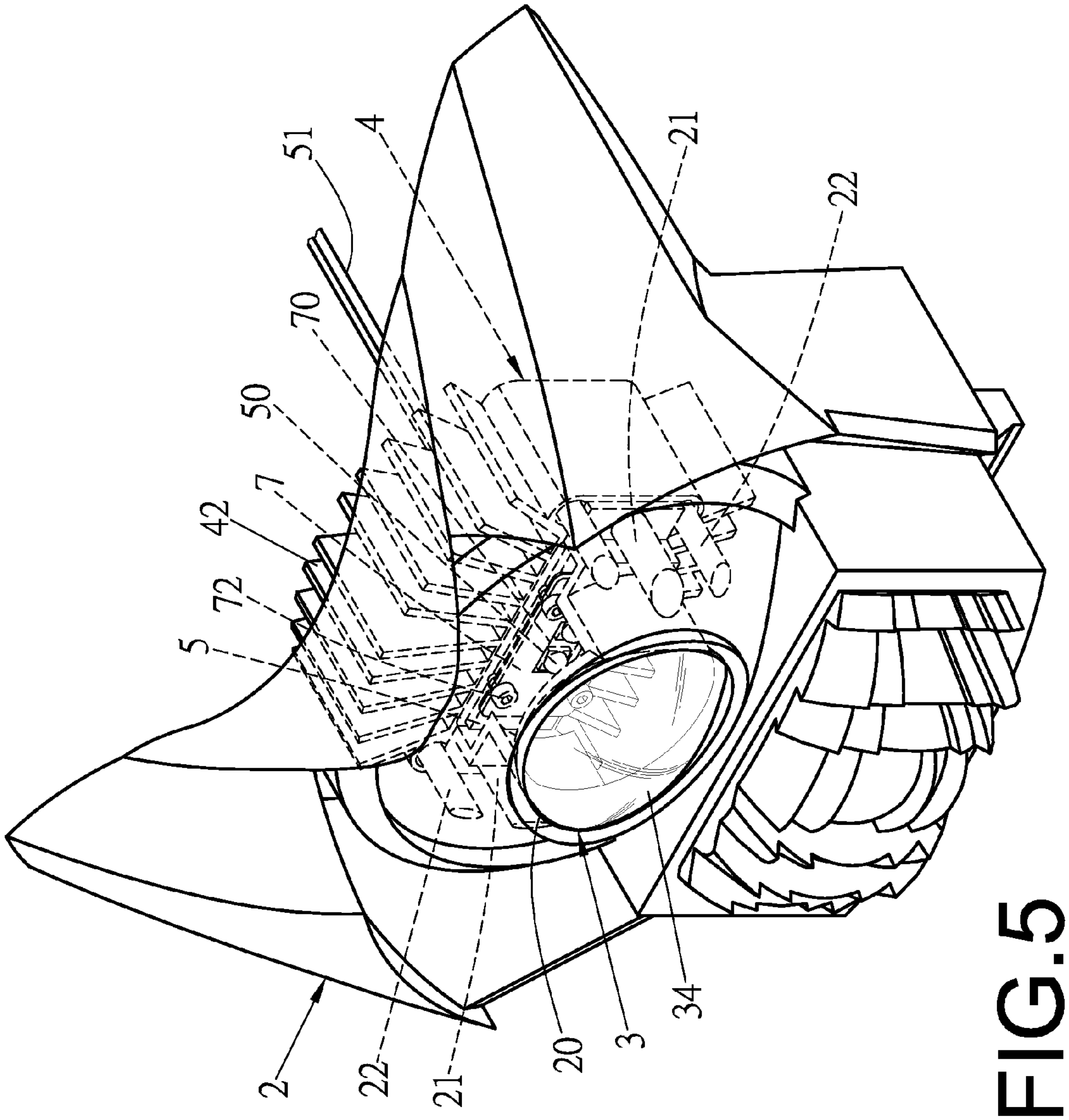
FIG. 5 is a perspective view to show the vehicle headlight assembly of the present invention.
Figure 6:
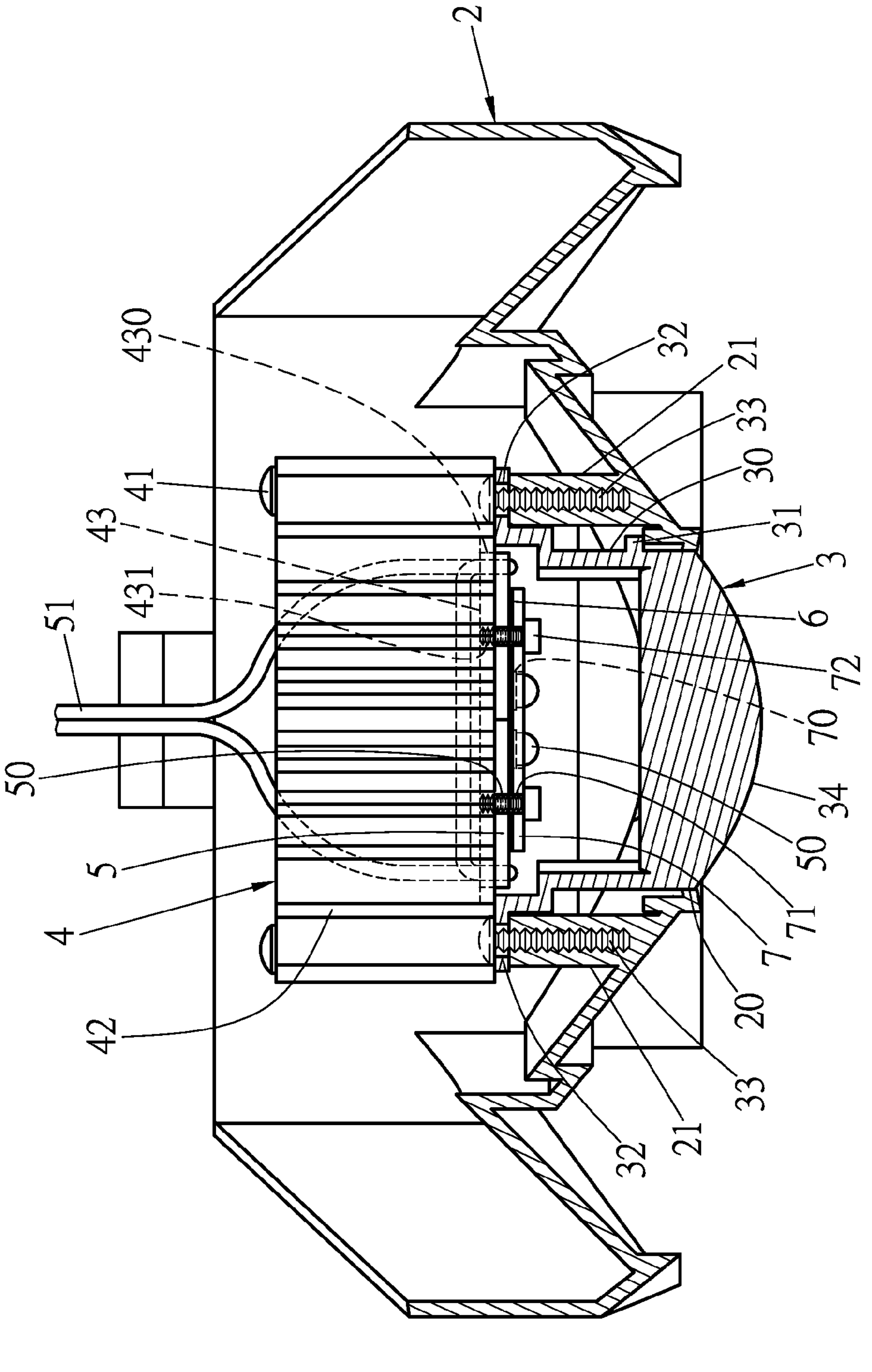
FIG. 6 is a cross sectional view to show the vehicle headlight assembly of the present invention.

Referring to FIGS. 2 and 3, the vehicle headlight assembly of the present invention comprises a housing 2 having a first hole 20. Multiple first fixing tubes 21 and second fixing tubes 22 extend from the inside of the housing 2. A lens 3 is located in the first hole 20 of the housing 2 and has at least two legs 30 extending backward from the periphery thereof. Each of the at least two legs 30 of the lens 3 is stepped shaped, and a protrusion 31 extends from the outside of each of the at least two legs 30 of the lens 3. Each of the at least two legs 30 has a second hole 32 defined through the distal end thereof. Multiple first fixing members 33 respectively extend through the second holes 32 and are threadedly connected to the first fixing tubes 21 of the housing 2. The lens 3 has a multiple-focus curved surface 34 on the front side thereof. The multiple-focus curved surface of the lens is designed to let the light beams be delivered to desired angles and areas as shown in FIG. 4.

A radiation member 4 is located in the housing 2 and behind the lens 3. The radiation member 4 has multiple third holes 40. Multiple second fixing members 41 extend through the third holes 40 and are threadedly connected to the second fixing tubes 22 of the housing 2. The radiation member 4 has multiple fins 42 extending from the periphery thereof. A fixing board 43 is connected to the front side of the radiation member 4 and has multiple fourth holes 430 and threaded holes 431.

At least one circuit board 5 is connected to the fixing board 43 and has multiple Light Emitting Diodes 50 (LEDs 50) connected to the front side thereof, and multiple wires 51 are connected to the rear side of the at least one circuit board 5. The wires 51 extend through the fourth holes 430 of the fixing board 43. The at least one circuit board 5 has multiple first notches 52 defined in the periphery thereof. The at least one circuit board 5 has an isolation plate 6 connected thereto which has a first opening 60 defined centrally therethrough. The Light Emitting Diodes 50 on the at least one circuit board 5 extend through the first opening 60. The isolation plate 6 has multiple second notches 61 defined in THE periphery thereof, and the second notches 61 are located corresponding to the first notches 52 of the at least one circuit board 5. The isolation plate 6 has a fixing plate 7 connected thereto which has a second opening 70 located corresponding to the first opening 60 of the isolation plate 6. The fixing plate 7 has multiple third notches 71 defined in the periphery thereof. The third notches 71 are located corresponding to the second notches 61 of the isolation plate 6 and the first notches 52 of the at least one circuit board 5. Multiple third fixing members 72 extend through the third notches 71 of the fixing plate 7, the second notches 61 of the isolation plate 6 and the first notches 52 of the at least one circuit board 5, and are threadedly connected to the threaded holes 431 of the fixing board 43 of the radiation member 4.

As shown in FIGS. 2 to 6, when assembling, the lens 3 is first installed in the first hole 20 of the housing 2 and the legs 30 of the lens 3 are to be connected to the first fixing tubes 21. The first fixing members 33 then extend through the second holes 32 of the lens 3 and are connected to the first fixing tubes 21 of the housing 2. The at least one circuit board 5 is connected to the fixing board 43 of the radiation member 4. The wires 51 on the rear side of the at least one circuit board 5 extend through the fourth hole 430 of the fixing board 43. The first notches 52 of the at least one circuit board 5 are located corresponding to the threaded holes 431 of the fixing board 43, the isolation plate 6 is then connected to the at least one circuit board 5. The Light Emitting Diodes 50 of the at least one circuit board 5 are located in the first opening 60 of the isolation plate 6. The second notches 61 of the isolation plate 6 are located corresponding to the first notches 52 of the at least one circuit board 5 and the threaded holes 431 of the fixing board 43. The positioning plate 7 is then connected to the isolation plate 6. The second opening 70 of the positioning plate 7 is located corresponding to the first opening 60 of the isolation plate 6, and the Light Emitting Diodes 50 of the at least one circuit board 5 are located in the second opening 70 of the positioning plate 7. The third notches 71 are located corresponding to the second notches 61 of the isolation plate 6, the first notches 52 of the at least one circuit board 5 and the threaded holes 431 of the fixing board 43 of the radiation member 4. The third fixing members 72 extend through the third notches 71 of the fixing plate 7, the second notches 61 of the isolation plate 6 and the first notches 52 of the at least one circuit board 5, and are threadedly connected to the threaded holes 431 of the fixing board 43 of the radiation member 4. Therefore, the at least one circuit board 5 is fixed to the radiation member 4. The radiation member 4 is then installed in the housing 2 to let the third hole 40 be in alignment with the second fixing tubes 22 of the housing 2. The second fixing members 41 extend through the third hole 40 of the radiation member 4 and are threadedly connected to the second fixing tubes 22 of the housing 2 such that the radiation member 4 is secured in the housing 2.

Figure 7:
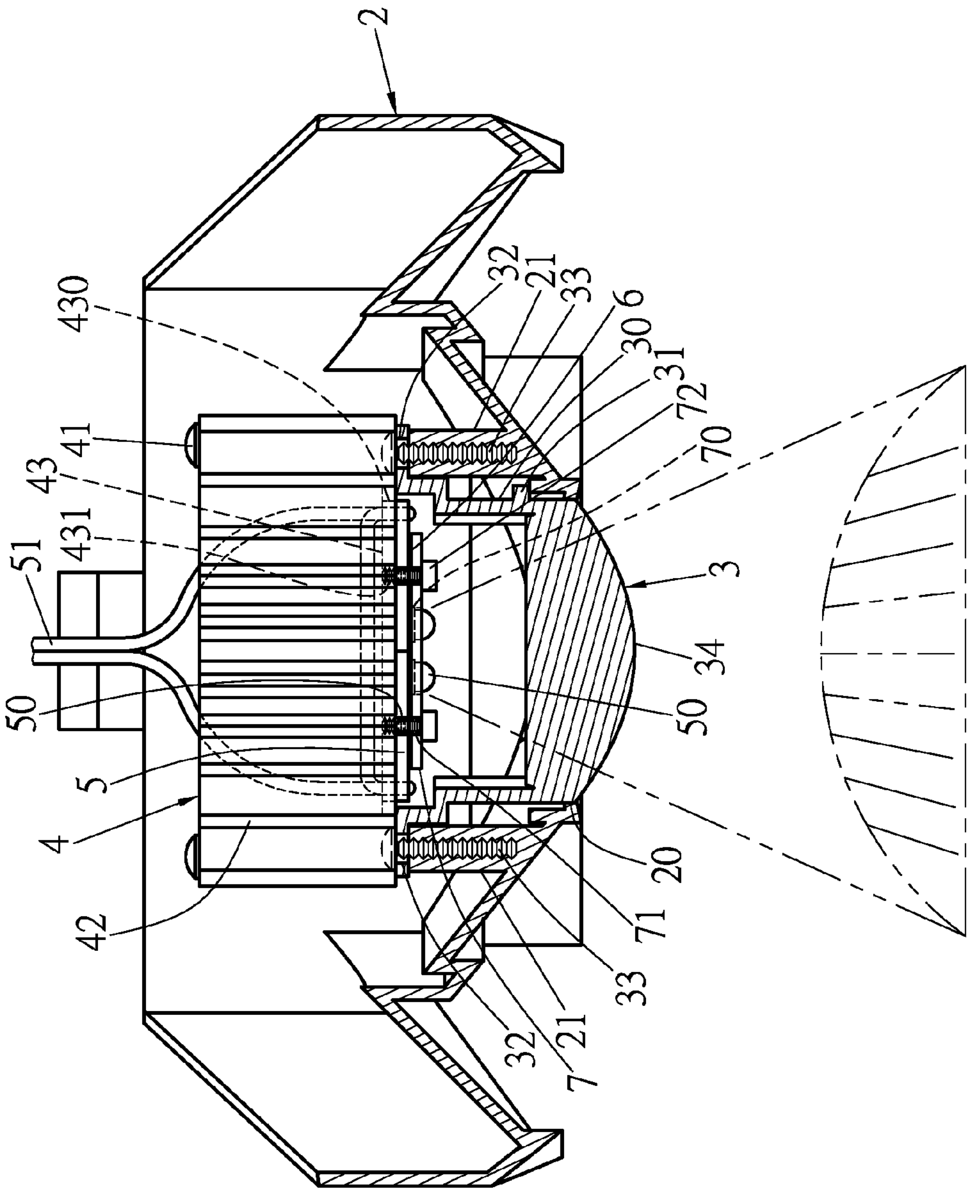
FIG. 7 shows the shape of the light beams on a wall of the vehicle headlight assembly of the present invention.
Figure 8:
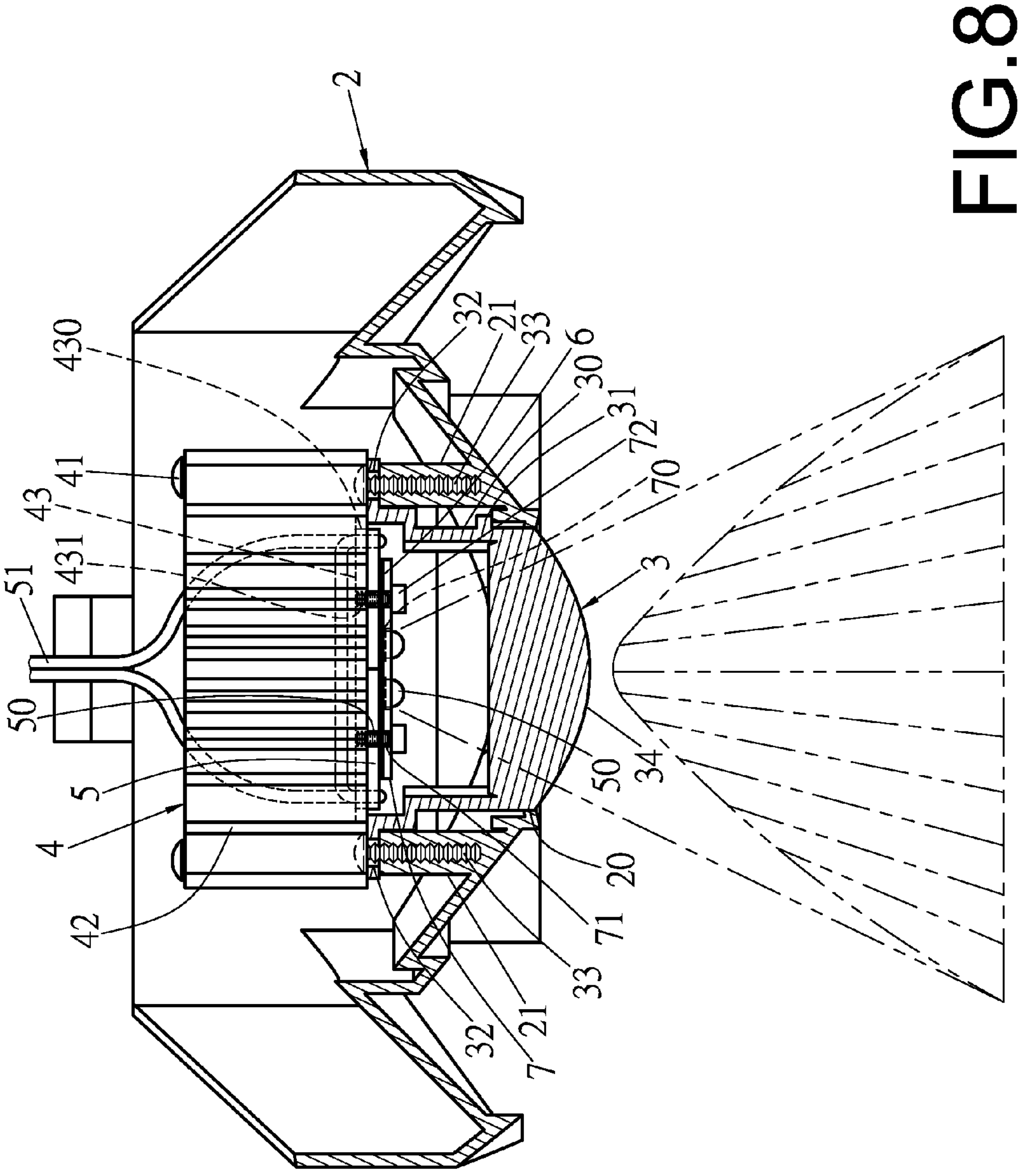
FIG. 8 shows the shape of the light beams on a road of the vehicle headlight assembly of the present invention.

When in use, as shown in FIGS. 7 and 8, the light beams from the Light Emitting Diodes 50 directly go through the multiple-focus curved surface 34 of the lens 3 and the multiple-focus curved surface 34 of the lens 3 delivers the light beams to the desired angles and areas. FIG. 7 shows the shape of the light beams on a wall of the vehicle headlight assembly of the present invention, and FIG. 8 shows the shape of the light beams on a road of the vehicle headlight assembly of the present invention. It is noted that the vehicle headlight assembly does not need the shade and the light beams can be controlled to be delivered to the desired angles and areas. The light beams are even and have better illumination. The radiation member 4 removes the heat generated from the Light Emitting Diodes 50 by the fins 42 on the radiation member 4 so as to prolong the life term of the vehicle headlight assembly.

While we have shown and described the embodiment in accordance with the present invention, it should be clear to those skilled in the art that further embodiments may be made without departing from the scope of the present invention.

What is claimed is:

1. A vehicle headlight assembly comprising:

a housing having a first hole, multiple first fixing tubes and second fixing tubes extending from an inside of the housing;

a lens located in the first hole of the housing and having at least two legs extending backward therefrom, each of the at least two legs having a second hole defined through a distal end thereof, multiple first fixing members respectively extending through the second holes and being threadedly connected to the first fixing tubes of the housing, the lens having a multiple-focus curved surface on a front side thereof;

a radiation member located in the housing and behind the lens, the radiation member having multiple third holes, multiple second fixing members extending through the third holes and being threadedly connected to the second fixing tubes of the housing, the radiation member having multiple fins extending therefrom, a fixing board connected to a front side of the radiation member and having multiple fourth holes and threaded holes, and at least one circuit board connected to the fixing board and having multiple Light Emitting Diodes connected to a front side thereof, wires being connected to a rear side of the at least one circuit board and extending through the fourth holes of the fixing board, the at least one circuit board having multiple first notches defined in a periphery thereof, multiple third fixing members extending through the first notches and being threadedly connected to the threaded holes of the fixing board on the radiation member.

2. The assembly as claimed in claim 1, wherein the at least two legs of the lens each are stepped shaped, a protrusion extends from outside of each of the at least two legs of the lens.

3. The assembly as claimed in claim 1, wherein the at least one circuit board has an isolation plate connected thereto which has a first opening defined centrally therethrough, the Light Emitting Diodes on the at least one circuit board extend through the first opening, the isolation plate has multiple second notches defined in a periphery thereof, the second notches are located corresponding to the first notches of the at least one circuit board, the isolation plate has a fixing plate connected thereto which has a second opening located corresponding to the first opening of the isolation plate, the fixing plate has multiple third notches defined in a periphery thereof, the third notches are located corresponding to the second notches of the isolation plate and the first notches of the at least one circuit board, the third fixing members extend through the third notches of the fixing plate, the second notches of the isolation plate and the first notches of the at least one circuit board, and are threadedly connected to the threaded holes of the fixing board of the radiation member.

* * * * *